June 7, 1932.  E. R. TROCHE  1,861,990
APPARATUS FOR HANDLING STRAND MATERIAL
Filed May 10, 1930
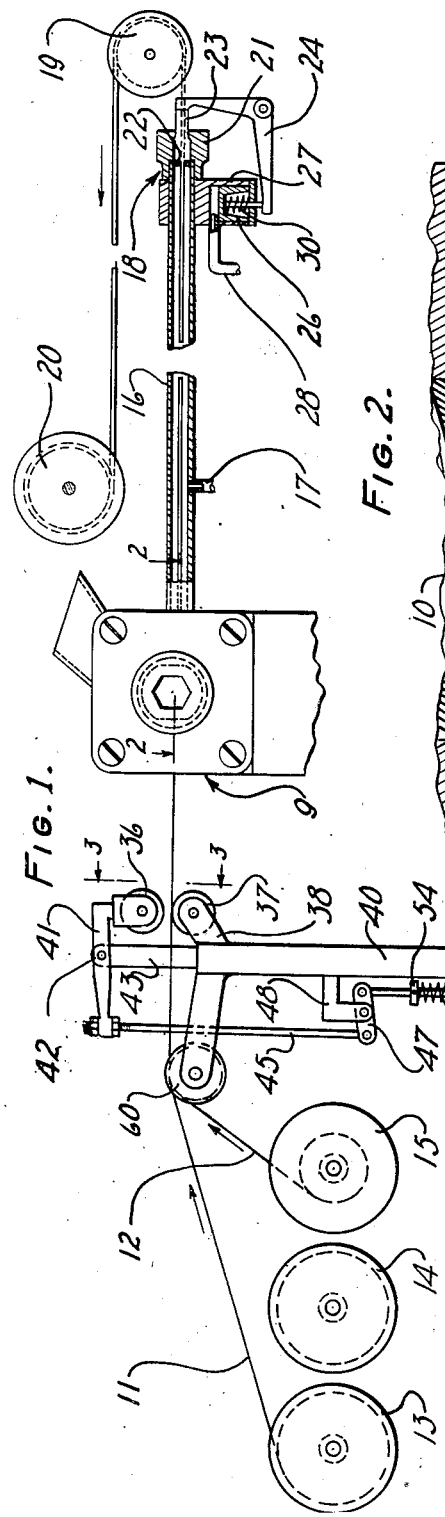
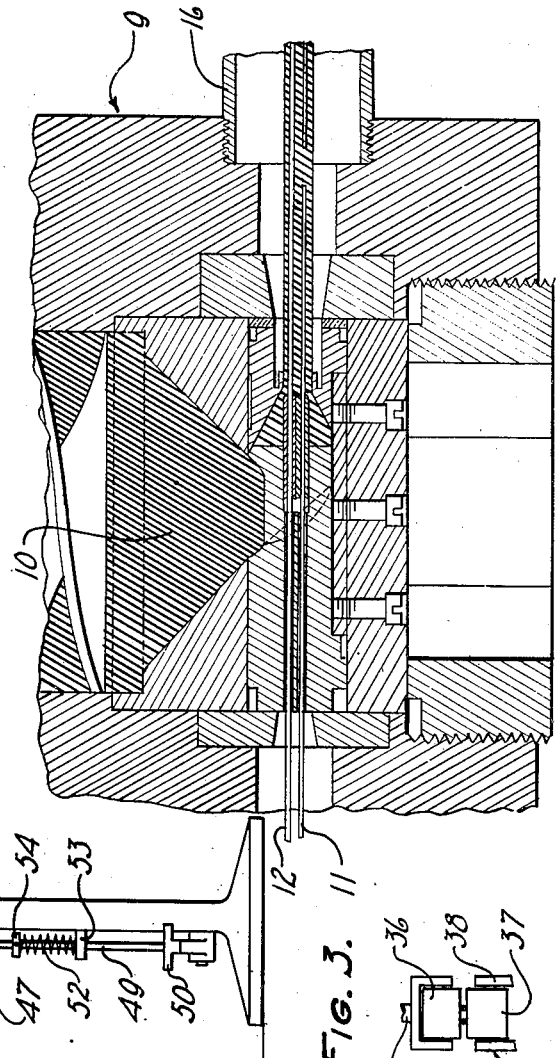
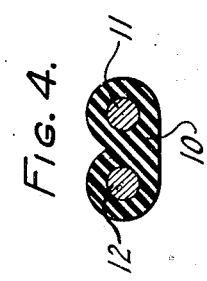
INVENTOR
E. R. TROCHE
BY
E. R. Nowlan
ATTORNEY.

Patented June 7, 1932

1,861,990

UNITED STATES PATENT OFFICE

ERNEST R. TROCHE, OF BALTIMORE, MARYLAND, ASSIGNOR TO WESTERN ELECTRIC COMPANY, INCORPORATED, OF NEW YORK, N. Y., A CORPORATION OF NEW YORK

APPARATUS FOR HANDLING STRAND MATERIAL

Application filed May 10, 1930. Serial No. 451,501.

This invention relates to apparatus for handling strand material, and more particularly to an apparatus for continuously feeding a plurality of wires during the process of applying coating material thereto.

The invention is particularly applicable to an apparatus for feeding a plurality of wires to machines for continuously extruding and vulcanizing a covering of rubber compound or other insulating material upon wires. In the operation of such machines, a plurality of wires are moved in parallel relationship through an insulating head wherein a covering of vulcanizable insulating material is applied to them, and are then passed through an elongated chamber, wherein they are subjected to the action of steam or other heating means to effect vulcanization of the covering.

An object of the present invention is to provide a simple and improved apparatus for expeditiously handling moving strands.

One embodiment of the invention contemplates the provision in a machine for continuously extruding an insulating covering upon a pair of wires drawn from individual supplies, of mechanism whereby when one wire supply becomes exhausted, the forward end of a new wire supply may be fed into the extrusion machine without interrupting the extruding operation. One form of the invention comprises a pair of normally separated idler rollers between which the pair of wires pass from their supplies to the extrusion machine. When one of the wire supplies becomes exhausted, the rollers are adapted to be moved toward each other to engage the continuing wire and the forward end of the new wire supply, whereby the rollers are driven through the movement of the continuing wire and thereby advance the new wire toward the extrusion machine. The end of the new wire may be manually inserted into the insulating head of the extrusion machine, after which the rollers are restored to their normally separated positions.

It is believed that a complete understanding of the invention will be had from the following description taken in conjunction with the accompanying drawing, wherein Fig. 1 is an elevational view, partly in section, diagrammatically illustrating one form of apparatus embodying the features of the invention;

Fig. 2 is an enlarged fragmentary plan section on line 2—2 of Fig. 1;

Fig. 3 is a fragmentary detail view on line 3—3 of Fig. 1, with the feed rollers shown in their operative positions; and Fig. 4 is an enlarged cross sectional view of a pair of conductors provided with a common covering.

In the drawing, the reference numeral 9 designates the insulating head of an extrusion machine of any suitable construction adapted to simultaneously apply under pressure a covering of rubber compound or other material 10 to wires 11 and 12 which pass therethrough from supply reels 13, 14 and 15. The extrusion machine may be of any suitable type, such as that shown in the application of G. L. Cherry, Serial No. 353,042, filed April 6, 1929, and may be designed to apply a common covering to the two wires of the form illustrated in Fig. 4, or may apply separate coverings thereto, as desired. The supply reels are so mounted with respect to the extrusion machine that when one reel becomes exhausted the wire from another reel may be threaded into the machine without removing the exhausted reel. From the extrusion machine, the newly coated wires are passed through a chamber 16, into which steam or other heating medium is admitted through an inlet 17, the heating medium being maintained under pressure in said chamber. From chamber 16 the coated and heat treated wires pass through a substantially steam-tight seal 18, and thence over a capstan 19 to a take-up reel 20. Capstan 19 is driven, by means not shown, at a predetermined speed which is coordinated with the extruding speed of the insulating head 9.

The seal 18 may be of any suitable construction, the one illustrated in the accompanying drawing comprising a threaded cap 21 which holds apertured discs 22, of rubber or other resilient material against the end of the steam chamber 16. A hollow cylindrical retaining member 23 holds the discs 22 in yielding contact with the coated wires 11 and 12 moving therethrough to prevent leakage of the steam from the chamber. The retaining member 23 is held in position by a bell-crank lever 24 which is yieldingly urged against the retaining member by means of a piston 26 mounted in a cylinder 27 and actuated by compressed air other pressure medium admitted through duct 28, the piston being yieldingly urged upwardly by a coil spring 30.

An auxiliary wire feeding mechanism embodying the features of the present invention is positioned between the supply reels and the insulating head 9. This mechanism comprises a pair of cooperating oppositely disposed idler rollers 36 and 37, the roller 37 being supported by arms 38 attached to or formed integral with a vertical standard or pedestal 40. The roller 36 is carried at one end of a lever 41 which is pivoted at 42 upon a vertical arm 43 extending from the pedestal 40. The lever 41 is adjustably connected at its opposite end to the upper end of a vertical rod 45, which is connected at its lower end to one end of a lever 47 pivotally supported intermediate its ends by an arm 48 extending from the pedestal 40. The lever 47 is connected at its opposite end to the upper end of a vertical rod 49 which is connected at its lower end to a foot treadle 50. The construction just described is such that when the foot treadle 50 is pressed downwardly, the roller 36 is moved downwardly toward the roller 37 against the action of a coil spring 52 interposed between fixed arm 53 and a collar 54 secured to the rod 49, the spring 52 serving to normally hold the roller 36 separated from the roller 37, as shown in Fig. 1.

In the operation of the above described, apparatus, wires 11 and 12 are drawn in parallel relationship from the supply reels 13 and 15 over a grooved guide sheave 60, between the normally separated idler rollers 36 and 37, and then through the insulating head 9 which extrudes an insulating covering thereon. The wires are then passed through the steam chamber 16 and around capstan 19 to the take-up reel 20, the distance between capstan 19 and take-up reel 20 being sufficiently great to permit the covering to cool and harden.

The arrangement of the supply reels 13, 14 and 15 is preferably such that when the wire on a given reel 15 is exhausted, the wire passing from the other reel 13 is about half unwound, thus providing a staggered relation between the wires which prevents both reels from becoming exhausted at the same time. When the wire on a given reel 15 is nearly exhausted, the forward end of the wire from the new reel 14 is threaded over the guide sheave 60 and between the idler rollers 36 and 37. As the rear end of the exhausted wire passes between the rollers, the foot treadle 50 is pressed downwardly causing the roller 36 to move downwardly toward the roller 37 in such manner that the continuing wire and the forward end of the new wire supply is compressed between the two rollers, as shown in Fig. 3. The rollers 36 and 37, being thus driven through the movement of the continuing wire, advance the forward end of the new wire supply toward the insulating head 9. When a suitable amount of wire from the new supply has been advanced by the rollers 36 and 37, the forward end of the new wire is manually inserted into the insulating head 9 and is thereafter carried along with the continuing wire by the extruded covering. The new wire is advanced by the rollers 36 and 37 with a sufficient amount of slack between the rollers and the insulating head to reduce to a minimum the tensile stresses in the insulating covering and the continuing wire incident to the drawing of the new wire through the apparatus. When the forward end of the new wire has passed through the greater portion of the steam chamber 16, the insulating covering has sufficient tensile strength, due to its being vulcanized, to start the rotation of the new supply and draw the new wire through the apparatus. When this point is reached, the foot treadle is released thereby allowing the roller 36 to return to its normally separated position under the action of the spring 52.

It is to be understood that the embodiment of the invention herein illustrated and described represents merely one useful form of the invention which is capable of modifications and numerous other applications within the scope of the appended claims.

What is claimed is:

1. In an apparatus for handling strand material, a plurality of strand supplies, means for advancing a strand from one of the supplies, and means movable into engagement with the advancing strand for advancing a strand from another of the supplies in parallel spaced relationship with the advancing strand.

2. In an apparatus for handling strand material, a plurality of strand supplies, means for advancing a strand from one of the supplies, and a roller normally separated from the moving strand and movable into engagement therewith and effective upon such engagement for advancing a strand from another of the supplies in parallel spaced relationship with the advancing strand.

3. In an apparatus for handling strand material, a plurality of strand supplies, means for advancing a strand from one of the supplies, a roller adapted to be driven by the advancing strand for advancing a further strand from another of the supplies in non-overlapping relationship, and means for normally holding the roller separated from the advancing strand.

4. In an apparatus for handling strand material, a plurality of strand supplies, means for advancing a strand from one of the supplies, a pivotally supported roller movable into engagement with the advancing strand and driven thereby for advancing a strand from another of the supplies, means for normally holding the roller separated from the advancing strand, and means for moving the roller into engagement with the advancing strand.

5. In an apparatus for feeding strand material, a plurality of strand supplies, means for advancing a strand from one of the supplies, an idler roller engaging the advancing strand and adapted to be driven thereby, a second roller disposed opposite the first roller and movable with respect thereto, means normally holding the second roller spaced from the advancing strand, and means for moving the second roller into engagement with the advancing strand and a second strand from another of the supplies, whereby the second strand is advanced by the rollers through their rotation by the first strand.

6. In an apparatus for feeding strand material, a plurality of strand supplies, means for advancing a strand from one of the supplies, cooperating idler rollers disposed on opposite sides of the advancing strand, means normally holding the rollers separated from each other to permit the free passage of the strand therebetween, and means for moving the rollers into engagement with the advancing strand and a second strand from another of the supplies, whereby the rollers are driven by the advancing strand and thereby advance the second strand in non-overlapping relationship with the first-mentioned strand.

7. In an apparatus for feeding strand material, a plurality of strand supplies, means for advancing parallel strands from some of the supplies in spaced relationship, a pair of cooperating auxiliary feed rollers disposed on opposite sides of the advancing strands, means normally holding one of the feed rollers spaced from the advancing strands to thereby permit the free passage of said strands between the rollers, and means for moving the last mentioned roller into engagement with one of the advancing strands and the forward end of an additional strand from another of the supplies, whereby the rollers are driven through the movement of the advancing strand and thereby advance the additional strand.

In witness whereof, I hereunto subscribe my name this 30 day of April A. D. 1930.

ERNEST R. TROCHE.